United States Patent
Koeppe

(10) Patent No.: US 9,405,384 B2
(45) Date of Patent: Aug. 2, 2016

(54) COMPUTER SYSTEM AND CONTROL METHOD FOR SAME

(71) Applicant: ISIQIRI INTERFACE TECHNOLOGIES GmbH, Hagenberg (AT)

(72) Inventor: Robert Koeppe, Hagenberg (AT)

(73) Assignee: ISIQIRI INTERFACE TECHNOLOGIES GMBH, Hagenberg (AT)

(*) Notice: Subject to any disclaimer, the term of this patent is extended or adjusted under 35 U.S.C. 154(b) by 68 days.

(21) Appl. No.: 14/367,833

(22) PCT Filed: Dec. 7, 2012

(86) PCT No.: PCT/AT2012/050190
§ 371 (c)(1),
(2) Date: Jun. 20, 2014

(87) PCT Pub. No.: WO2013/090960
PCT Pub. Date: Jun. 27, 2013

(65) Prior Publication Data
US 2014/0375564 A1  Dec. 25, 2014

(30) Foreign Application Priority Data
Dec. 20, 2011 (AT) .................. A 1852/2011

(51) Int. Cl.
*G06F 3/0354* (2013.01)
*G06F 3/03* (2006.01)
*G06F 3/038* (2013.01)
(Continued)

(52) U.S. Cl.
CPC .......... *G06F 3/03543* (2013.01); *G06F 3/0304* (2013.01); *G06F 3/0346* (2013.01); *G06F 3/0386* (2013.01); *G06F 3/042* (2013.01)

(58) Field of Classification Search
CPC combination set(s) only.
See application file for complete search history.

(56) References Cited

U.S. PATENT DOCUMENTS

| 7,161,578 | B1 | 1/2007 | Schneider |
| 8,405,640 | B2 | 3/2013 | Ebner et al. |

(Continued)

FOREIGN PATENT DOCUMENTS

| CN | 201369026 | 12/2009 |
| DE | 10192575 | 11/2002 |

(Continued)

OTHER PUBLICATIONS

International Search Report for PCT/AT2012/050190, English translation attached to original, Both completed by the European Patent Office on Mar. 19, 2013, All together 7 Pages.

*Primary Examiner* — Gerald Johnson
*Assistant Examiner* — Robert Michaud
(74) *Attorney, Agent, or Firm* — Brooks Kushman P.C.

(57) ABSTRACT

A computer system, including data-processing equipment and a freely movable input device, wherein the input device contains at least one position change sensor from which information can be sent to the data-processing equipment and wherein the data-processing equipment can also capture information about the absolute position of the input device. Information about the absolute position of the input device can be captured by the data-processing equipment as a result of the fact that the data-processing equipment is in data communication with a light-sensitive, position-sensitive input surface and the input device emits a light beam, the point of incidence of which on the input surface can be detected by the latter.

9 Claims, 1 Drawing Sheet

(51) Int. Cl.
*G06F 3/042* (2006.01)
*G06F 3/0346* (2013.01)

(56) References Cited

U.S. PATENT DOCUMENTS

| | | | |
|---|---|---|---|
| 2005/0134555 A1 | 6/2005 | Liao | |
| 2009/0015744 A1 | 1/2009 | Sekine | |
| 2009/0115744 A1* | 5/2009 | Zhang | G06F 3/0346 345/179 |
| 2010/0103269 A1* | 4/2010 | Wilson | A63F 13/10 348/169 |
| 2010/0123659 A1* | 5/2010 | Beeman | G06F 3/0346 345/157 |
| 2010/0238137 A1* | 9/2010 | Han | G06F 3/017 345/175 |
| 2011/0006985 A1* | 1/2011 | Koeppe | G06F 3/0386 345/158 |
| 2011/0063206 A1 | 3/2011 | Karaoguz et al. | |
| 2012/0113003 A1 | 5/2012 | Ebner | |

FOREIGN PATENT DOCUMENTS

| | | |
|---|---|---|
| DE | 102006053239 | 5/2008 |
| EP | 1775656 | 4/2007 |
| EP | 1832966 | 9/2007 |
| JP | 2004310528 | 11/2004 |
| KR | 20040066986 | 7/2004 |
| WO | 9939304 | 8/1999 |
| WO | 2007046604 | 4/2007 |
| WO | 2010006348 | 1/2010 |
| WO | 2010118450 | 10/2010 |

\* cited by examiner

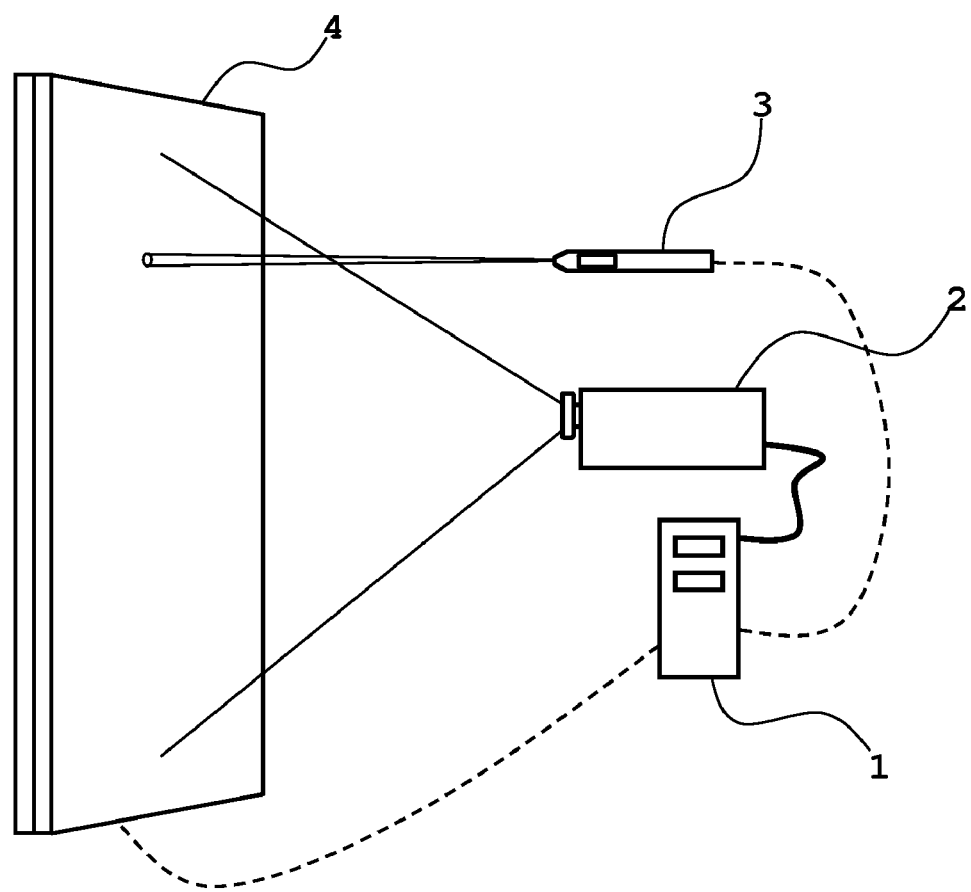

COMPUTER SYSTEM AND CONTROL METHOD FOR SAME

CROSS-REFERENCE TO RELATED APPLICATIONS

This application is the U.S. national phase of PCT Application No. PCT/AT2012/050190 filed on 7 Dec. 2012, which claims priority to AT Patent Application No. A 1852/2011 filed on 20 Dec. 2011, the disclosures of which are incorporated in their entirety by reference herein.

The invention relates to a computer system and a control method for same. The computer system according to the invention has a data processing unit, a light-sensitive position-sensitive input surface and a movable input device.

The documents CN 201369026 Y, DE 101 92 575 T1, DE 10 2006 053 239 A1, EP 1 775 656 A1, JP2004310528 A, KR 2004 0066 986 A and US 2005 1345 55 A1 propose input devices for data processing systems, in which laser pointers and, as position change sensors, inertial sensors are contained in a housing. The inertial sensors are used to shift a working mark on a display surface. The laser pointer is not used as an input device but rather to guide the audience's attention to a particular surface area of the display surface during a presentation. By virtue of position change sensors and laser pointers being combined in one device, the person giving the presentation is spared the handling of a second device. By virtue of the fact that the position change sensors are inertial sensors, that is to say "directly" measure translational or rotational accelerations, there is no need for a surface along which the input device must be moved, like in a computer mouse.

EP 1050015 B1 describes a common principle for a so-called "optical computer mouse". The input device is moved with sliding guidance on a surface. It illuminates a small surface area of the surface, records images of the illuminated surface area and calculates the position shift which has taken place using the shift of pixels which are recorded in temporal succession and are identified as being the same. The device is well suited to measuring the relative shift of the input device on a surface from a point. If the housing is in the form of a pen, the movements which are required during handwriting can also be carried out well using said pen and handwriting can therefore already be detected during the writing operation.

WO 2007046604 A1 shows an input device having the form of a pen, for instance. It contains a plurality of mutually independent sensor devices for measuring a position change. One sensor device is based on the principle of the "optical computer mouse" (as discussed above), and further sensor devices are inertial sensors. As a result, the input device is also functional when it is raised from a surface. A contact sensor detects whether or not the device is resting on a surface. If it is resting on the surface, the operating state "optical computer mouse" is automatically set, in which case handwriting or hand drawings can already be read in very effectively during production.

WO 2010006348 A1 and WO 2010118450 A1 show a computer system which can be controlled by means of a light-sensitive position-sensitive input surface. The input surface is a flat optical waveguide and the movable input device is a pointing device which emits a light beam. The light incident on the input surface from the pointing device causes longer-wave light in the waveguide mode as a result of luminescence, the intensity of which light decreases with the distance from the point of incidence of the causative light. Small photoelectric sensors are fitted at a plurality of points on the input surface, at which electrical signals are generated, the signal strength of which is dependent on the local intensity of the light in the waveguide mode and from which the point of incidence of the causative light is inferred. By virtue of the fact that the input surface may also be the output surface for image information output by the data processing unit, the pointing device can also effectively determine the absolute position of a processing mark (a "cursor") from a distance. Small movements of the processing mark, as occur for example when "handwriting" is effected on the input surface with the aid of the pointing device which may have the form of a pen, can be effectively detected using metrology, however, only when the input surface allows a very high position resolution. This is disruptively complicated, in particular, in the case of input surfaces which are sufficiently large to also be used as an output surface of the data processing unit for presentation in front of a relatively large audience. Movements of the input device for which the light beam emitted by the latter does not point to the input surface cannot be determined by the data processing unit.

EP 1832966 A2 describes the practice of controlling a data processing unit with the aid of a freely movable pointing device. Two "selective" infrared light sources are fitted in a defined position at the edge of a display surface for the data processing unit. The pointing device has a camera which is sensitive to these light sources. The position of the camera and therefore of the pointing device is inferred from the position of the image of the light spots by means of the camera. In addition to the camera, the pointing device also has inertial sensors (=sensors for rotational and/or translational accelerations) which, irrespective of the absolute position of the pointing device, can detect position changes of the latter and can inform the data processing system of said changes. As a result, the pointing device can also be used when its camera is facing away from the infrared light spots. The computer system equipped in this manner is readily used for games in which sports activities are interactively simulated, in which case the players move the pointing device like a piece of sports equipment, for example a tennis racket. The control method is too coarse and too susceptible to faults for many typical non-games computer applications. There is good functionality only when the pointing device is not too near and not too far away from the display surface in a relatively narrow distance range.

The inventor has addressed the problem of improving a computer system, which, like that according to EP 1832966 A2, comprises a data processing unit, an output surface which is sufficiently large for presentations in front of an audience and a movable input device, from which data relating to its absolute position and data relating to its position changes are used to control the data processing unit, to the effect that the susceptibility to faults is reduced and the distance range in which the input device must be situated in order to be highly functional is increased.

In order to solve the problem, it is proposed, as a first measure, to equip the computer system with features which are known from the above-described WO 2010006348 A1, namely to provide a projection display which is also a position-sensitive optical input surface, and to additionally use a freely movable input device which emits a visible light beam (also called "pointing beam"), from which—if applicable—the coordinates of the point of incidence on the input surface can be detected by the latter and can be transmitted to the data processing unit.

As a further absolutely necessary measure, it is proposed to also equip the input device with one or more position change sensors which, irrespective of the position with respect to the input surface, detect position changes of the input device and transmit them to the data processing unit via a data connection.

By virtue of the fact that the input surface is in the form of a light-sensitive position detector, the position of an input mark can be immediately determined and detected on it without the input mark having first to be oriented in a suitable manner from a display edge, like in a computer mouse.

By virtue of the fact that the input device has position change sensors, position changes in which the input device does not point to the input surface at all and/or position changes which are too fine for the position resolution of the sensitive input surface can also be effectively detected.

In any case, the principle of control using the input surface with the aid of a light pointer can be carried out without faults up to such large distances between the pointing device and the input surface and details displayed on the input surface—which is simultaneously the display surface for the data processing system—such as buttons etc. are discernible to the eye.

In the most preferred embodiment, a position change sensor of the input device is an optical sensor for position changes with respect to a surface along which the input device slides. (The relevant sensor principle is described, for example, in EP 1050015 B1 mentioned at the outset.)

For this purpose, the input device preferably has the form of a pen, in which case the optical sensor for position changes with respect to a surface along which the input device slides is arranged at a tip of the pen. The input device can therefore be guided on a surface, like a pen, and hand drawings and handwriting can already be effectively read into the data processing unit during application to the input surface (or else to any other surface) irrespective of the position resolution capability of the input surface.

If work is carried out on the input surface in the form of a light-sensitive position detector using the optical sensor for position changes with respect to a surface along which the input device slides, a particular advantage results from the combination of the two position detection methods. Although the optical sensor for position changes, which is arranged in the input device, can track very fine movements, it does not have the option of detecting the absolute position of the interaction point on the input surface. This is effected with the aid of the light pointer of the input device in interaction with the position-sensitive input surface therefor. The absolute position coordinates of the input device on the input surface can therefore be added to the relative movement coordinates of the position change sensor for the input device.

Therefore, both the position of the input mark can be determined with a very high degree of absolute positional accuracy and fine and quick movements of the input marks can be simultaneously detected quickly and in a manner accurate in every detail for the first time. This advantage is achieved with relatively little system complexity and is also definitely provided in the case of very large input surfaces.

In another advantageous embodiment, the input device is equipped with one or more inertial sensors, that is to say sensors which measure linear or rotational acceleration. Information can therefore be input to the data processing unit irrespective of whether the pointing beam emitted by the input device is incident on the input surface or whether the input device is resting on a surface (which is required so that a possibly present optical sensor for position changes with respect to a surface along which the input device slides can operate).

A very advantageous effect is also produced in this case from the combination of the sensors which measure movement changes of the input device with that sensor principle which at least measures, from the actual position of the input device, to which point of the input surface the input device is oriented. The inertial sensors alone do not have a reference, that is to say the inertial sensors alone could not determine the point to which pointing is actually being effected with the input device, but rather only relative movements can be detected. However, as soon as the light pointer points to the input surface, this reference can be taken. If a plurality of reference points which are spaced apart are determined—which can easily happen if the light spot of the light pointer is repeatedly incident on the input surface or is moved across the latter without interruption—the absolute position and orientation of the input device relative to the input surface can be determined together with the angle change determined in the meantime by the inertial sensors. This enables a multiplicity of new and intuitive input options for the user of the combined input device.

If, in terms of sensors for position changes, the input device contains both an optical sensor for position changes with respect to a surface along which the input device slides and an inertial sensor, it combines the following functions in one housing:

A pointing device which is used to direct the audience's attention to a particular area of a presentation surface.

A pointing device which is used to set a position mark of the data processing unit to a particular area of the input surface. In this case, the input surface is preferably simultaneously the output surface of the data processing unit and therefore also the presentation surface.

A writing and drawing device for handwriting and/or hand drawings to be input to the data processing unit. In this case, the "writing substrate" may be both the input surface in the form of an optical position detector and other surfaces, for example normal furniture surfaces.

A motion sensor for "free" movements in order to therefore detect the dynamics of relatively large movements which are independent of the input surface. The movement of a piece of sports equipment represented by the input device during simulation can be effectively detected thereby during sports simulations, for example. Movements of a remote-controlled robot arm in space can likewise also be effectively controlled thereby.

The invention is illustrated using a sketch:

FIG. 1: shows the essential devices of a computer system according to the invention. Data connections which are preferably implemented by means of a wireless connection are illustrated using dashed lines.

The computer system illustrated in FIG. 1 has a data processing unit 1 which outputs image information to a projection surface via a projector 2. An input device 3 and a light-sensitive position-sensitive input surface 4, which is preferably arranged as a layer of the projection surface, are used to control the system.

In one of a plurality of possible methods of operation, the input device 3 transmits a light beam to the input surface 4. The light spot caused thereby on the input surface 4 causes one or more output signals from the input surface which are used to inform the data processing unit 1 of the coordinates of the light spot on the input surface. The data processing unit can assign a processing mark (=cursor position) to the point of incidence of the light spot, caused by the light beam from the input device, on the input surface 4.

The input surface 4 is preferably formed by a layer structure made of organic material, which layer structure generates electrical signals on the basis of absorbed light and is equipped with a plurality of tapping points for the signals generated, the size of the signals at the individual tapping points being dependent on their distance from the subsurfaces at which the light is absorbed, and the distance ratios of the respective tapping points to those subsurfaces at which the light is absorbed being able to be calculated from the size ratios of the signals at a plurality of tapping points. Input surfaces of this type are prior art which has become known in the meantime. They have the particular advantage that they can also be used as a layer in front of or directly behind a projection screen since they can be designed with a largely neutral color and are comparatively very cost-effective, in particular in a large design. Another advantageous design of the detector surface is in the form of a frame around a display surface, an optical system being connected upstream of the input device in this case and projecting the light from the input device onto the input surface in the form of a diverging cross. A signal is generated at the points of intersection between the projected light cross and the detector surface in the form of a frame. As long as at least 3 points of intersection are detected, the pointing direction of the input device can be inferred from the position of the points of intersection. This frame can be mounted around any form of display surface without impairing its image reproduction.

Such an input surface is particularly preferably in the form of a luminescence waveguide, the tapping points being small photoelectric elements which output light from the waveguide mode in the luminescence waveguide and generate an electrical signal, the strength of which is dependent on the intensity of the output light. This functional principle can be formed particularly effectively with rapid responsiveness and with low susceptibility to interference from extraneous light.

In another method of operation which can run in parallel with and in a complementary manner to the previously described method of operation, the input device 3 transmits information relating to its movement state to the data processing unit 1, which movement state is determined by inertial sensors, that is to say linear or rotational acceleration sensors which are installed in the input device 3. A function, for example "confirm selection", can therefore be assigned, for example, to a pivoting movement of the input device around the light beam emitted by the latter as an axis by the program running in the data processing unit. An identical movement of a piece of sports equipment, a tool or a robot arm may likewise be assigned to a path movement and pivoting movement of the input device 3 by a program.

In a third important method of operation, the input device 3 is resting on a stationary surface and operates on the latter according to the functional principle of an optical mouse described above using the prior art, which mouse transmits the data relating to its position changes with respect to the stationary surface to the data processing unit 1. If the surface in question is also the projection surface onto which the data processing unit 1 projects output information using a projector 2 and if the input device 3 is in the form of a pen for this purpose and its sensor area is arranged at the pen tip for relative movement with respect to the stationary surface, the profile of a line may be assigned to the movement of the pen tip on the projection surface by the data processing unit 1 and this line can be read in as handwriting or a hand drawing and can also be output in a visible manner again via the projector 2 even though the input device itself does not need to emit any color.

In probably the most advantageous method of operation of the computer system, the projection surface is simultaneously the input surface 4. In order to write on the input surface 4 using the input device 3, the absolute position of the input device 3 with respect to the input surface is determined by the sensor function of the input surface. In contrast, the fine rapid movements of the input device during writing are determined by the "optical mouse" function of the input device 3 itself and are transmitted to the data processing unit 1 while circumventing the sensor function of the input surface.

During input, the absolute position determined by the input surface is advantageously compared at regular intervals with the position which is determined by the relative movement coordinates and at which the input mark is set, and the position determined by the relative movement coordinates is adjusted to the position determined by the input surface with the aid of mathematical interpolation methods. The input mark therefore always remains in the vicinity of the tip of the input device even in the case of long, continuous input operations.

The invention claimed is:

1. A computer system which comprises:
    a freely moveable input device, which emits a light beam and comprises at least one position change sensor for the measurement of its relative position changes;
    a light-sensitive position-sensitive input surface, which measures the location of the point of incidence of said light beam on itself; and
    a data processing system having a data connection to said light-sensitive position-sensitive input surface,
    wherein said data processing system is programmed to calculate the absolute position of said input device using said relative movement data provided by said at least one position change sensor for the measurement of relative position changes of said input device and the absolute position data of said point of incidence of said light beam on said input surface.

2. The computer system as claimed in claim 1, wherein said input device comprises a position change sensor that is an optical sensor which can be used to determine position changes of said input device with respect to a surface along which said input device slides by virtue of images of a section of said surface being continuously recorded and the relative shift of identical pixels in images recorded in temporal succession being evaluated.

3. The computer system as claimed in claim 1, wherein said input device comprises one or more inertial sensors, that is to say sensors for translational and/or rotational acceleration.

4. The computer system as claimed in claim 1, wherein said input surface is formed by a layer structure made of organic material, which layer structure generates electrical signals on the basis of absorbed light and is equipped with a plurality of tapping points for the signals generated, the size of the signals at the individual tapping points being dependent on their distance from the subsurfaces at which the light is absorbed, and the distance ratios of the respective tapping points to those subsurfaces at which the light is absorbed being able to be calculated from the size ratios of the signals at a plurality of tapping points.

5. A method for
    determining the absolute position of a freely moveable input device, comprising:
    providing a freely moveable input device, which emits a light beam and comprises at least one position change sensor for the measurement of its relative position changes;
    providing a light-sensitive position-sensitive input surface, which measures the location of the point of incidence of said light beam on itself;
    providing a data processing system;

transmitting the relative movement data provided by said at least one position change sensor for the measurement of relative position changes of said input device to the data processing system;

transmitting the absolute position data of said point of incidence of said light beam on said input surface to the data processing system; and calculating with the data processing system the absolute position of said input device using said relative movement data and said absolute position data.

6. The method as claimed in claim 5, wherein during writing or drawing movements with said input device on said input surface, on the one hand absolute position coordinates of said input device are determined by said input surface using said light beam emitted by said input device and transmitted to said data processing system and on the other hand data relating to position changes of said input device are acquired by said position change sensor fitted to said input device and transmitted to said data processing system, for which purpose images of the surface along which said input device slides are continuously recorded by said position change sensor and the relative shift of identical pixels in images recorded in succession is evaluated.

7. The method as claimed in claim 6, wherein during input, the absolute position determined by said input surface is compared at regular intervals with that position which is calculated from the results from said position change sensor fitted to said input device, wherein the two positions are assigned a third position jointly representing both positions by said data processing system by means of mathematical interpolation, which third position is at a shorter distance from the two first positions than the distance between the two first positions, wherein an input mark is assigned to this third position by said data processing system, and wherein this third position is assumed to be the starting point for calculating the temporally next movement of said input device.

8. The method as claimed in claim 5, wherein during movements of said input device in space, information relating to position changes of said input device is detected by one or more inertial sensors fitted to said input device and is transmitted to said data processing system, wherein the shape and size of a movement path are calculated thereby in said data processing system, and wherein the orientation of said path in space is calculated using the position information provided by said input surface as soon as the light spot from said input device is repeatedly incident on said input surface or is moved across the latter without interruption.

9. A method to determine the absolute position of a freely moveable input device, comprising:

said freely moveable input device, which emits a light beam and comprises at least one position change sensor for the measurement of its relative position changes;

a light-sensitive position-sensitive input surface, which measures the location of the point of incidence of said light beam on itself;

and a data processing system;

said method comprising the steps of:

transmitting the relative movement data provided by said at least one position change sensor for the measurement of relative position changes of said input device to the data processing system;

transmitting the absolute position data of said point of incidence of said light beam on said input surface to the data processing system;

calculating with the data processing system the absolute position of said input device using said relative movement data and said absolute position data.

* * * * *